Dec. 21, 1965  J. R. HANSON  3,224,112
CARD HOLDER WITH MOVABLE SHUTTERS AND INTERCHANGEABLE
CARDS FOR INSERTION THEREIN AND A SECOND CARD HOLDER
WITH A SPINNER AND INTERCHANGEABLE CARDS
Filed June 29, 1962  2 Sheets-Sheet 1
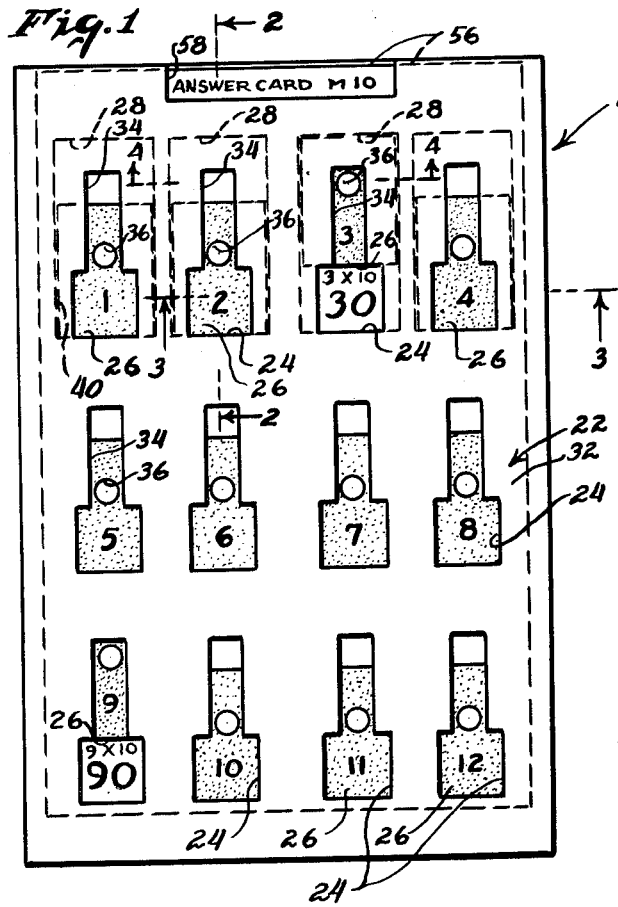
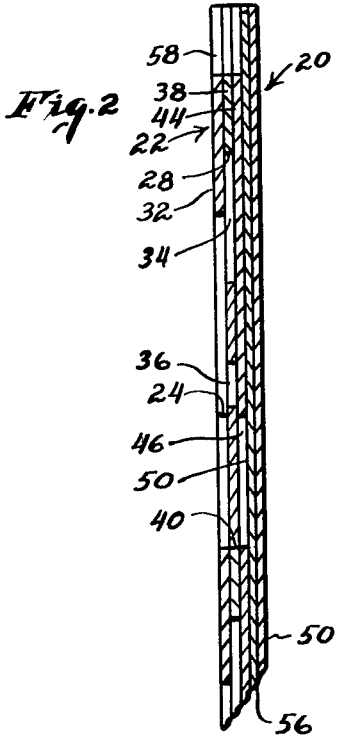
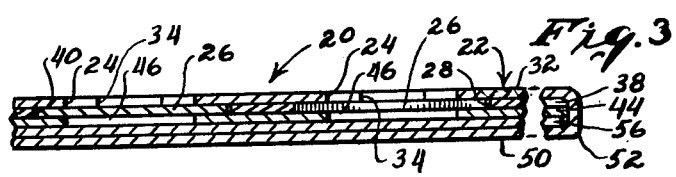
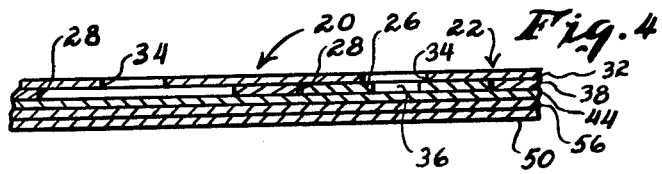
INVENTOR.
John R. Hanson
BY Emery, Whittemore
Sandoe & Graham
ATTORNEYS Dec. 21, 1965 J. R. HANSON 3,224,112
CARD HOLDER WITH MOVABLE SHUTTERS AND INTERCHANGEABLE
CARDS FOR INSERTION THEREIN AND A SECOND CARD HOLDER
WITH A SPINNER AND INTERCHANGEABLE CARDS
Filed June 29, 1962 2 Sheets-Sheet 2
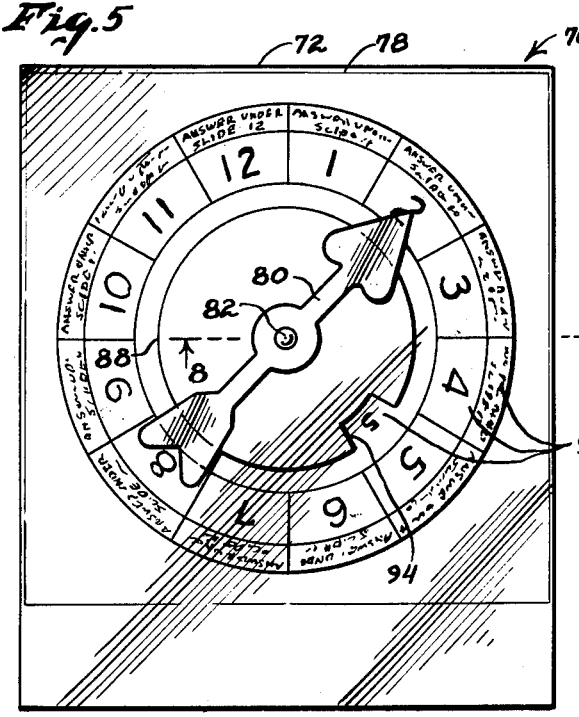
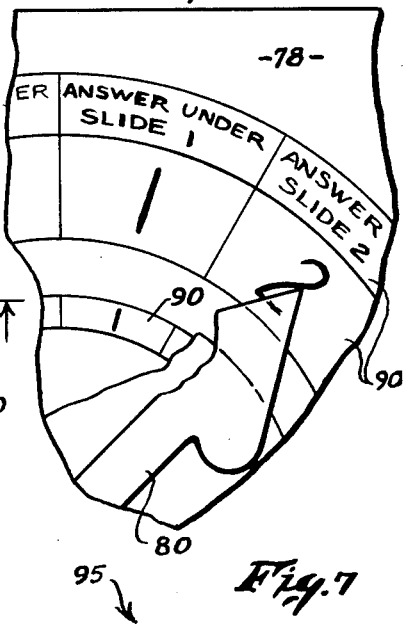
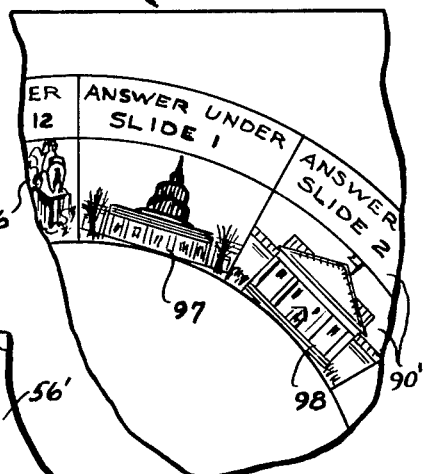
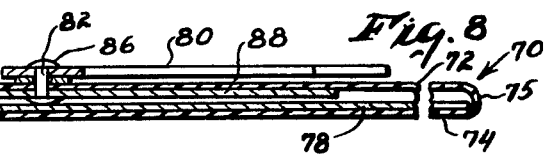
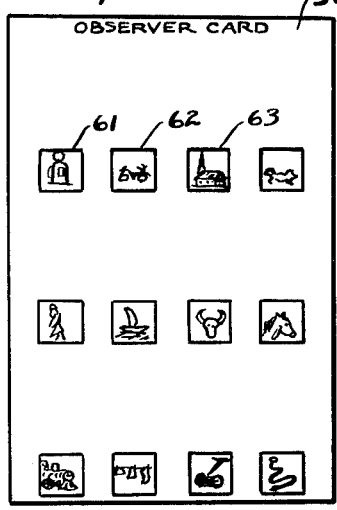
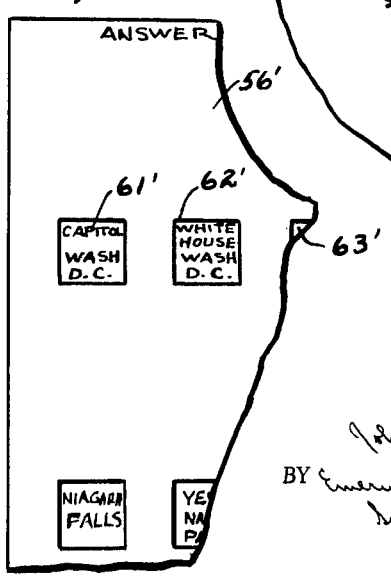
INVENTOR.
John R. Hanson
BY Emery, Whittemore,
Dunbar & Durham
ATTORNEYS United States Patent Office 3,224,112
Patented Dec. 21, 1965

3,224,112
CARD HOLDER WITH MOVABLE SHUTTERS AND INTERCHANGEABLE CARDS FOR INSERTION THEREIN AND A SECOND CARD HOLDER WITH A SPINNER AND INTERCHANGEABLE CARDS
John R. Hanson, 26 Monica Drive, Little Rock, Ark.
Filed June 29, 1962, Ser. No. 206,391
11 Claims. (Cl. 35—9)

This invention relates to amusement devices which can be used for competitive play and which can be used also for educational purposes.

One object of the invention is to provide an improved amusement device having question and answer cards, and a holder for the answer cards with separate shutters that cover the answers and that can be moved selectively to uncover any answer as needed. Each of the shutters is identified by a number, or otherwise, and the question card indicates the particular shutter behind which the answer to each question will be found.

In the preferred embodiment of the invention, there is a spinner or other chance selector device for designating the question that each player must answer when his turn comes when using the invention as a quiz game. The variety of subject matter is unlimited. The game may have question and answer cards where the addition, subtraction, multiplication, and division of numbers are the questions and such a game is valuable in teaching children arithmetic. It may have questions relating to other subjects such as history, sports, science, etc. The question card may merely have pictures of objects and the players must spell the word that identifies the object or give the location where the particular object will be found.

For more difficult play by adults, the question cards may have pictures of places or persons that are to be identified; or they may have questions relating to literature, music, and other subjects offering a challenge to more mature minds. Although corresponding question and answer cards are preferably limited to one subject, this is not essential and for competitive play a card may have questions relating to different subjects.

Another object of the invention is to provide a novel card holder into which different cards can be inserted and with windows through which areas of the cards are exposed to view, and the holder has shutters that are movable between different positions for covering or exposing the card areas that are in register with the windows.

The invention can be used for amusing children on automobile trips by giving to each child a card holder with a card that has pictures at the different windows representing different familiar objects that are likely to be seen during the trip, for example, a bicycle, a church, a bus, and a bridge. All of the shutters are left in exposure position and as each child observes an object shown in one of the pictures, he moves the shutter into position to cover that picture. The child who covers all of his pictures first is the winner. Other cards can be inserted into the holder for continuing the game.

Other objects, features and advantages of the invention will appear or be pointed out as the description proceeds. In the drawing forming a part hereof, in which like reference characters indicate corresponding parts in all the views;

FIGURE 1 is a front view of a card holder made in accordance with this invention;

FIGURE 2 is a fragmentary, sectional view, on an enlarged scale, taken on the section line 2—2 of FIGURE 1;

FIGURES 3 and 4 are views similar to FIGURE 2 but taken on the lines 3—3 and 4—4, respectively, of FIGURE 1;

FIGURE 5 is a top plan view of a chance selection device constituting a spinner made in accordance with this invention;

FIGURE 6 is a fragmentary, enlarged view of a portion of the card used with the spinner shown in FIGURE 5;

FIGURE 7 is a view similar to FIGURE 6 but showing a different card which may be used with the spinner shown in FIGURE 5;

FIGURE 8 is a fragmentary, enlarged view taken on the line 8—8 of FIGURE 5;

FIGURE 9 is a view of a card which is used with the card holder of FIGURE 1;

FIGURE 10 is a view of another card that is used with the card holder of FIGURE 1.

FIGURE 1 shows a card holder 20 having a front panel 22 in which there are a plurality of windows 24. In the construction shown there are twelve windows arranged in three rows of four windows each.

There is a shutter 26 for each of the windows 24. Each shutter is movable between a lowered position in which it covers the area which would otherwise be exposed through the window and is movable into an exposure position in which the window is unobstructed. In FIGURE 1 the shutters 26 for the first three windows 24 are stippled for clearer illustration. The first two shutters 26 are in their closed positions and the third window has its shutter 26 in its exposure position.

There is a pocket 28 behind the front panel 22 and in which the shutter 26 slides. Each of the windows has a pocket 28 but for simplier illustration in the drawing only some of the pockets 28 are shown.

The construction of the card holder 20 is shown in detail in the sectional views, FIGURES 2, 3 and 4. The panel 22 is of composite construction. It has a front ply 32 in which the windows 24 are cut out. At the top of each window there is a slot 34 extending upwardly from the window to provide access to a cut out 36, shown in the drawings as a circular opening, by which the shutter 26 is moved up and down. A finger tip or finger nail inserted into the cut out 36 makes movement of the shutters convenient.

The pocket 28 is formed by providing cut outs in a second ply 38 located behind the front ply 32. The cut out in the second ply 38 is made slightly wider than the windows 24 and also extends a slight distance below the bottom of each window. This provides side pockets 40 along both sides of the shutters 26 for guiding the shutters and holding them in the plane of the panel 22.

The panel 22 includes a third ply 44. This ply 44 is continuous except for cut outs 46 and these cut outs are the rearward part of the windows 24.

The card holder has the plies 32, 38 and 44 connected together, preferably by adhesive between areas of the plies that confront one another. The holder 20 has a rear panel 50 which is attached to the front panel at 52 (FIGURE 3) along both of the vertical parallel edges of the front panel and the rear panel. The space between the panel 22 and the rear panel 50 is opened to receive a card 56. The front panel 22 and rear panel 50 form, in effect, a flat tube into which the card 56 can be inserted as in an envelope. The lower ends of the panels 22 and 50 may have some connection between them to provide a stop for limiting the distance to which the card 56 can be inserted into the holder.

There is a recess 58 along the top edge of the front panel 22 for exposing an area of the upper part of the card 56. On this exposed area there are indicia for identifying the card so that the proper card can be inserted into the holder for use with a question card to which it corresponds, and which will be explained in connection with the other views (FIGURES 9 and 10).

Each of the cards 56 has areas 61, 62 and 63 in position to register with different windows of the card holder when the card 56 is inserted in the holder. The card 56 has a picture at each of the areas 61–63. FIGURE 10 shows another card 56' having areas 61', 62' and 63' which have other indicia consisting of legends which identify buildings and cities. It will be understood that the indicia on any area of the card which is to register with the window of the card holder depends upon the information which is to be given for answering questions on question cards which will be explained later or for indicating familiar objects which may be seen on an automobile trip and which are to be identified by children playing with the cards and card holders.

FIGURE 5 shows a second card holder 70. This card holder has a front panel 72 (FIGURE 8) and a rear panel 74 connected together along edges at 75 and forming an envelope for receiving a question card 78. The front panel 72 of the second card holder 70 has a spinner 80 rotatably supported on a stud 82 connected to the front panel 72 by a riveted head 86, or other suitable fastening means. There is a disc 88 behind the front panel 72. This disc 88 is opaque but the front panel 72 is transparent.

The question card 78 has angularly extending areas 90 which are disposed about a center which is coincident with the axis of the stud 82 when the card 78 is properly inserted into the second card holder 70. Thus when the spinner 80 is rotated, it will come to rest with the head of the spinner pointing to one of the angularly extending areas 90.

FIGURE 6 shows a portion of the card 78. There is an outer circle of angularly extending areas with indicia designating the shutter of the card holder 20 behind which the answer will be found for the question presented by a corresponding angularly extending area of the next innermost circle of areas 90. In FIGURE 6 these areas 90 of the next innermost circle of areas contain numerals. And there is another inner circle of areas 90 which also contains numerals.

The card 78 is used for arithmetic problems. The disc 88 (FIGURE 5 and 8) covers up the innermost circle of angularly extending areas except at a cut out 94 formed in the periphery of the disc 88. This cut out 94 is large enough to expose one of the angularly extending areas 90 of the innermost circle. If the card holder is to be used for playing a game in which numerals are to be multiplied by five, then the disc 88 is turned to the position which exposes the angularly extending area of the innermost circle and the one which has the numeral 5 designated on it. This disc 88 remains in any set position and is not affected by rotation of the spinner 80.

The spinner 80 is then spun and if it stops with its end pointing to the numeral 2 in the second circle of angularly extending areas 90 then the problem presented is to multiply two by five and the answer is to be found under the shutter 2 as indicated by the indicia in the angularly extending area of the outermost circle corresponding to the numeral to which the spinner is pointing. If the problem is to divide the number shown in the innermost circle, and which is exposed at the cut out 94, by the numeral on which the spinner stops then a different answer card must be inserted into the card holder 20. It will be understood that there are separate answer cards for problems of addition, subtraction, multiplication and division and that there are different answer cards for each numeral which is to be exposed through the cut out 94.

There are, therefore, a great many answer cards which are used with the single question card 78 for playing different games with arithmetic, depending upon whether it is decided to add, subtract, multiply or divide the numbers that are to be exhibited and selected by the spinner. For other uses of the card holders there is usually only one answer card for each question card.

FIGURE 9 shows a card in which each of the areas for exposure through the windows contains indicia which represents an object, that is, which is a picture. For example, the area 61 shows a gasoline filling station pump; the area 62 shows a bicycle; and the area 63 shows a church. The other areas on the card shown in FIGURE 9 have pictures representing other objects which are likely to be seen on an automobile trip. This card is used, therefore, for amusing children on trips, as previously explained. With all of the pictures originally exposed, the child pulls the appropriate shutter into closed position as each object is observed during the course of the trip.

FIGURE 10 shows an answer card for use with the question card shown in FIGURE 7. That question card, indicated by the reference character 95, has an outer circle of angularly extending areas 90' with indicia indicating the shutter under which the answer presented by the adjoining area will be found. The next circle of angularly extending areas on the card 94 include pictures 96, 97 and 98. The question presented by each of these pictures 96–98 is to name the object shown in the picture and to tell where it is located. In the card illustrated, the objects are famous buildings. For example, the building shown in the picture 97 is the Capitol at Washington, D.C., and the picture 98 is a representation of the White House.

The answer card 56', shown in FIGURE 10, has an area 61' with indicia thereon identifying the picture 97 as the Capitol at Washington, D.C. A similar area 62', which will be located behind the shutter number 2 in the card holder identifies the picture 98 as the White House at Washington, D.C. In similar manner there are areas with indicia for identifying all of the pictures which appear in the second circle of angularly extending areas on the card 95.

From the above description it will be apparent that numerous different cards can be inserted into the second card holder 70 with questions written out or with pictures of objects to be identified or persons to be named and an enormous variety of questions can be presented for persons playing the game. The game is ordinarily played by each person operating the spinner 80 in turn and then attempting to answer the question presented by the indicia on the angularly extending area to which the spinner points.

In accordance with the broader aspects of the invention, the spinner 80 is merely representative of chance selection means, an invention can be used with question cards having numbered questions and with the question selected for successive players by other chance selection means such as dice.

While the preferred embodiment of the invention has been illustrated and described, various changes and modifications can be made, and some features can be used in different combinations, without departing from the invention as defined in the claims.

What is claimed is:

1. An amusement device including a card holder having a front panel with windows therein, a different shutter associated with each of the windows and movable between a closed position in which it covers the window and an exposure position in which it leaves the window uncovered, an identifying indicium on the card holder for each of the shutters, a card that fits behind the front panel and that has indicia thereon at different areas that register with different windows, a spinner, a second card holder with which the spinner is connected, a card that fits the second card holder and that has a plurality of successive angularly extending areas around a circle that is swept by the spinner, indicia in the different angularly extending areas presenting questions that are answered by the indicia on the card that fits the first card holder, other indicia in each of said angularly extending areas identifying a window shutter of the first card holder behind which the answer will be found for the question presented by that particular angularly extending area.

2. The amusement device described in claim 1 characterized by a rear panel behind the front panel of the first card holder and connected with the front panel along the side edges of both panels to form a flat tube into which the card fits, the card being of a width substantially equal to the inside width of the flat tube.

3. The amusement device described in claim 1 characterized by a multi-ply front panel for the first card holder with pockets between some of the plies and into which the shutters extend and into which portions of the shutters are movable when the shutters move into position to uncover the windows.

4. The amusement device described in claim 3 characterized by shallow pockets between the plies along both longitudinal edges of the shutters for guiding the shutters and confining their movement to movement in the plane of the front panel, the pockets into which the shutters extend and into which the shutters are movable being at the ends of the pockets toward which the shutters move as they approach their exposure positions.

5. The amusement device described in claim 1 characterized by the second card holder being a flattened tube into which fits the card having the angularly extending areas, and means limiting the extent to which the card can be inserted into this flattened tube of the second card holder to a position where the center of the angular extent of said areas is substantially coincident with the axis of rotation of the spinner.

6. The amusement device described in claim 1 characterized by a group of interchangeable cards for insertion in the first card holder and a corresponding group of interchangeable cards for insertion in the second card holder, the indicia on the cards of each group identifying it with that card of the other group with which it must be used in the card holders.

7. The amusement device described in claim 1 characterized by an annular area on the card of the second card holder with its center substantially coincident with the center of rotation of the spinner and that is divided up into angularly areas by radial lines.

8. The amusement device described in claim 1 characterized by cards for teaching arithmetic, the cards that fit the second card holder having indicia on the angularly extending areas representing numbers that are quantities to be used in different arithmetical problems depending upon the area at which the spinner stops, a disc on the second card holder having a cut out in the periphery thereof that uncovers an auxiliary area of the second card that is otherwise covered by said disc, the disc being movable with respect to the second card to selectively uncover different portions of said auxiliary area, there being different numbers in the different portions of said auxiliary area, that serve as quantities for use in the arithmetical problems.

9. An amusement device including a card holder having a front panel with windows therein, a different shutter associated with each of the windows and movable between a closed position in which it covers the window and an exposure position which leaves the window uncovered, a second ply behind the front panel and extending on opposite sides of each window and apertured to form side guides for the shutters, a third ply comprising a flat sheet behind the second ply and coextensive with the windowed portion of the front panel and overlying at least the edges of the shutters that slide in the guides provided by the second ply, the third ply having windows therein in line with corresponding windows of the front panel, the card holder having a back panel secured around part of its periphery with the other part of the card holder and leaving a space behind the third ply for receiving a card which is held by the back panel in a position immediately behind the plies and the windows through the plies, a card having indicia thereon in position to be exhibited at the same time through the different windows of the card holder when the shutters are in exposure positions, the card being held by the third ply out of contact with edges of the shutters.

10. The amusement device described in claim 9 characterized by the shutters being flat and each of the shutters having an opening in its front surface for receiving a finger nail or other object that shifts the shutter between its closed and its exposure positions.

11. An amusement device including a card holder having a panel with windows therein, a different shutter associated with each of the windows and movable between a closed position in which it covers the window opening and an exposure position in which it leaves the window opening uncovered, an identifying indicium on the card holder for each of the shutters, a card insertable into the holder and having different areas of indicia thereon giving answers to questions, said areas corresponding in size and location to said windows, means behind the panel for removably holding the card in a definite position with respect to the panel with said areas of the card in register with said windows, a question card with indicia thereon, and a chance device which is adapted to be operated by successive users of the card holder and cards, the chance device including means for indicating which of the questions each user is to answer as his turn to answer comes, and the chance device comprising an envelope with a spinner rotatably mounted on a front side thereof, the question card being of a size to fit into the envelope and having its indicia angularly located around the path of the spinner, the envelope having means exposing the indicia on the question card through the front of the envelope.

References Cited by the Examiner

UNITED STATES PATENTS

| | | | |
|---|---|---|---|
| 2,520,347 | 8/1950 | Talcott | 46—37 |
| 3,014,727 | 12/1961 | Myers | 273—135 |
| 3,096,092 | 7/1963 | Bredehorn | 273—135 |

FOREIGN PATENTS

| | | |
|---|---|---|
| 391,201 | 4/1933 | Great Britain. |
| 285,040 | 4/1931 | Italy. |

DELBERT B. LOWE, *Primary Examiner.*